(No Model.)
J. HUSSUNG.
CHECK ROWER.
No. 306,689. Patented Oct. 14, 1884.
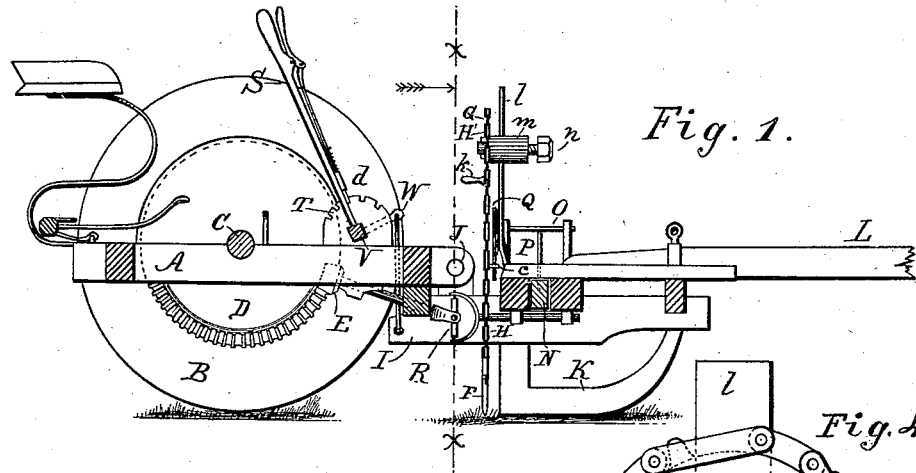
Fig. 1.
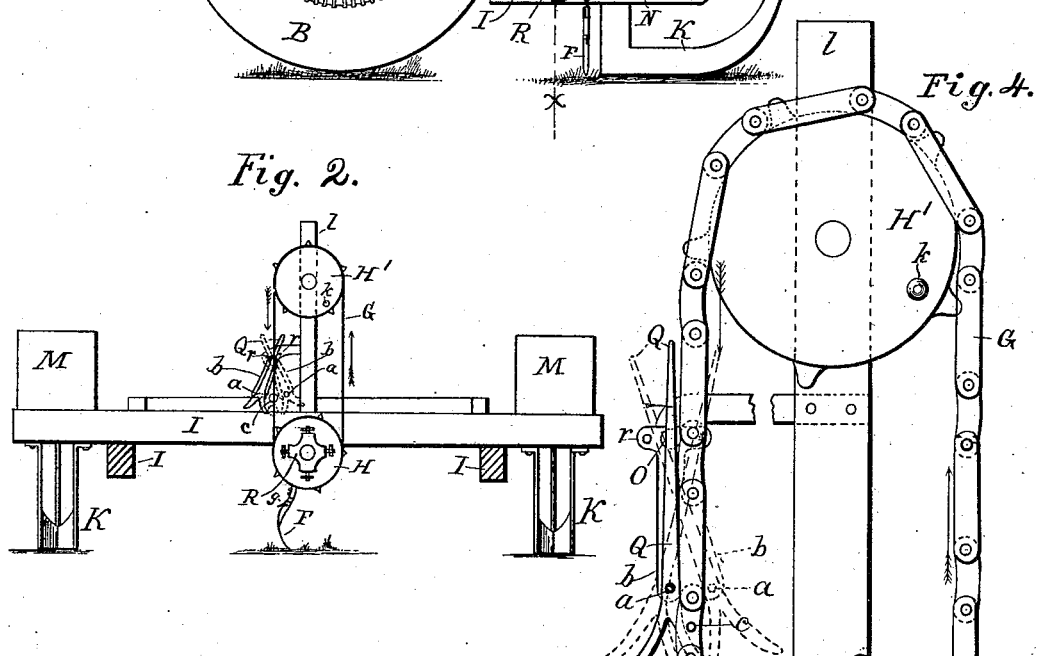
Fig. 2.
Fig. 4.
Fig. 3.
WITNESSES:
Thos. Houghton.
W. K. Sievers.
INVENTOR:
John Hussung
BY Munn & Co.
ATTORNEYS.
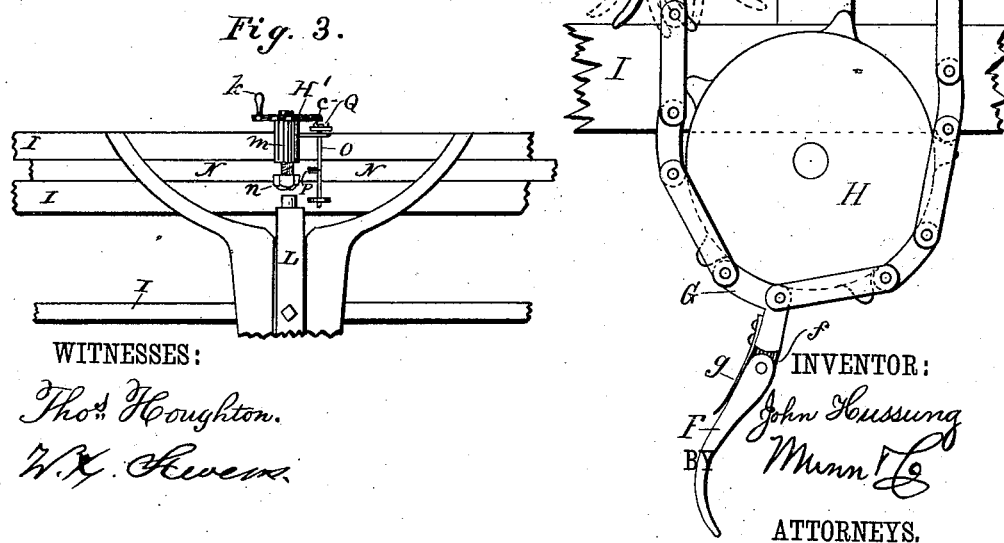

UNITED STATES PATENT OFFICE.

JOHN HUSSUNG, OF SHELBY CITY, KENTUCKY.

CHECK-ROWER.

SPECIFICATION forming part of Letters Patent No. 306,689, dated October 14, 1884.

Application filed February 14, 1884. (No model.)

*To all whom it may concern:*

Be it known that I, JOHN HUSSUNG, a citizen of the United States, residing at Shelby City, in the county of Boyle and State of Kentucky, have invented certain new and useful Improvements in Check-Rowers, of which the following is a description.

This invention relates to that class of corn-planters which are drawn over the field by a team to drop corn in one or more rows at a time, and in hills along the rows; and the object of this invention is to provide means whereby the distances between the hills may be regulated, and whereby a mark may be made on the ground opposite the hill, which will remain after the planter has passed, to indicate the location of the hills, so that the next row may be started in the desired relation thereto.

To this end my invention consists in the construction and combination of parts forming a check-rower, hereinafter described and claimed, reference being had to the accompanying drawings, in which—

Figure 1 is a longitudinal vertical section of a corn-planter, showing my invention. Fig. 2 is a transverse vertical section of the same at $xx$ of Fig. 1. Fig. 3 is a plan view of a portion of the same, and Fig. 4 is a detail view on a larger scale.

A represents the body of the machine, mounted on wheels B, which are connected with their shaft C, to revolve it by the act of advancing. Secured on this shaft is a beveled gear-wheel, D, which engages a pinion, E, whose duty is to revolve my marker. This marker consists of a finger, F, secured to a chain, G, to revolve around two wheels, H and H', which wheels are mounted on a frame, I, that is pivoted at J to the body A, to carry the planter-shoes K and the team-pole L.

M represents the seed-boxes, provided with a common sliding gate-bar, N. This bar N is reciprocated to open and close the gates, which drop the seed as follows: O is a rock-shaft mounted on the frame I and connected with the slide-bar by an arm, P. Q is a latch pivoted at $a$ to an arm, $b$, which is secured to the shaft O. $c$ is a pin in the chain G, adapted to engage the latch Q. R is a universal joint in line with the pivots J, connecting the wheel H with the shaft of pinion E. By this means motion is communicated from the drive-wheels B to the chain G at whatever angle of elevation the body A may be. This angle is varied to set the planter-shoes to plow deep or shallow furrows by means of a hand-lever, S, provided with a spring-detent, $d$, to engage a fixed toothed arc, T. The hand-lever is secured to a rock-shaft, V, carrying arms W, which are connected with the frame I at points to the rear of the pivots J. Suppose the forward end of the team-pole L to be carried at a fixed height from the ground, then, by pushing the handle forward, the rear ends of the frame will be depressed, thereby sinking the shoes deeper into the ground, and vice versa; or the shoes may be raised so high as to be carried above the ground when not in use.

The operation is as follows: As the planter advances, the chain G revolves, carrying the finger F to scratch a mark on the ground midway between two rows at every revolution of the chain, which is intended to be about two to the drive-wheel's one. To prevent this finger from being broken by being caught under roots or stones, I provide a joint, $f$, on which the finger may bend backward, and a spring, $g$, to throw the finger forward. The pin $c$ is just far enough behind the finger F on the chain to operate the gate-bar and plant two hills of corn at the same instant that the finger makes a mark in the ground between them. The path of the pin $c$ is directly past the center of the rock-shaft O, and the gate-bar N is reciprocated to slide first to the right and drop a hill of corn from each box, then to the left and again drop from each box. To accomplish this, I cause the pin to act first on one side and then on the other side of the latch Q, by pivoting the latch at or near its lower end to the arm $b$, and by shaping its lower end like a fish-tail, so that, in the act of pushing the arm out of its line, the pin pushes the fish-tail end of the latch past its hanging point, thus setting the upper end of the latch across the path of the next revolution of the pin, to guide the pin to act on the opposite side of the latch. The upper end of the latch rests alternately against two pins, $r$, secured in the arm, and the upper end of the latch is allowed to swing past the center of the rock-shaft O each way enough to permit the pin $c$ room to pass in line of said center, then the breadth of the fish-tail crossing the path of the pin is the amount that the pin will move the lever. In this manner each revolution of the pin changes the position of the latch to cross its path in the opposite direction, thereby sliding the gate-bar first one way and then the other. The upper chain-wheel, H', is provided with a crank, $k$, by which the wheel may be turned by hand to set the finger and dropper-pin right on starting each pair of rows, to correspond with those already planted.

To enable the operator to change the planter to drop the hills nearer together, I have provided the usual chain with removable links; and to readjust the two wheels to the right distance apart for the chain I provide a vertical post, $l$, and a stud, $m$, to be adjusted thereon by a set-screw, $n$, the stud serving as a shaft for the wheel H'.

What I claim as my invention, and wish to secure by Letters Patent, is—

1. The combination, with a check-rower body mounted on wheels and a frame hinged thereto carrying one or more seed-droppers, of a pair of wheels mounted one above the other in the said frame transversely thereto, a chain on the said wheels, a finger on the chain, and means connecting the chain-wheels with the drive-wheels, substantially as shown and described, whereby the rotation of the drive-wheels will cause the said finger to plow a mark on the ground transversely to the path of the machine at equal intervals, as described.

2. The combination, with a chain and means, substantially as described, for revolving the same on a check-rower transversely to the path of the latter, of a finger secured to a link in the chain, said finger having a hinge-joint in it at a distance from the chain-link joints, and a spring on the finger acting to retain the same straight, substantially as shown and described.

3. The combination, with a check-rower having a wheel mounted transversely to the path of the machine in a vertically-adjustable frame, of another wheel mounted above the first, and means for adjusting it to and from the first wheel, a chain carrying a finger mounted on the said wheels, the said chain being provided with removable links, and the amount of adjustment between the wheels corresponding to the sum of the lengths of the removable links, for the purpose specified.

4. The combination, with a seed-dropper having a slide-bar gate, of a rock-shaft having one arm connected with the said gate and having another arm provided with a long straight-bodied latch fish-tail shaped at one end, the said latch being pivoted near its fish-tail end to the said arm at some distance from the rock-shaft, to swing the body of the latch across the line of the rock-shaft, a chain mounted on wheels to travel past the end of the rock-shaft in line thereof, and a pin on the said chain to engage the said latch, as and for the purpose specified.

5. The combination, with a chain carrying a marking-finger and a pin bearing a given relation to said finger, of a seed-dropper having a slide-bar gate, a rock-shaft having one arm engaging said gate and another arm provided with a latch to engage the said pin, as shown and described.

6. The combination, with a pair of drive-wheels journaled on a shaft driven thereby, a body mounted on said shaft, a beveled gear-wheel on the shaft, another shaft longitudinal with the machine, provided with a pinion to engage said beveled gear-wheel, a seed-dropper frame pivoted to said body, a chain provided with a marking-finger, and a pin on said chain to operate the seed-dropper, wheels for said chain, and a universal joint connecting one of the said wheels with the said longitudinal shaft in line of the pivots joining the said frame and body, substantially as and for the purpose specified.

JOHN HUSSUNG.

Witnesses:
SOLON C. KEMON,
W. X. STEVENS.